(12) United States Patent
Leung

(10) Patent No.: US 6,860,153 B2
(45) Date of Patent: Mar. 1, 2005

(54) GAS PRESSURE SENSOR BASED ON SHORT-DISTANCE HEAT CONDUCTION AND METHOD FOR FABRICATING SAME

(75) Inventor: Albert M. Leung, Burnaby (CA)

(73) Assignee: Simon Fraser University, Burnaby (CA)

( * ) Notice: Subject to any disclaimer, the term of this patent is extended or adjusted under 35 U.S.C. 154(b) by 0 days.

(21) Appl. No.: 09/788,437

(22) Filed: Feb. 21, 2001

(65) Prior Publication Data

US 2001/0025531 A1 Oct. 4, 2001

Related U.S. Application Data

(60) Provisional application No. 60/183,811, filed on Feb. 22, 2000.

(51) Int. Cl.⁷ .............................................. G01L 19/04
(52) U.S. Cl. ............................ 73/708; 73/717; 73/719; 73/725; 438/52; 361/283.1
(58) Field of Search ......................... 73/708, 719, 725, 73/717, 753, 721, 727, 718, 724, 862.59, 754, 714; 438/52, 48; 361/283.1; 156/155; 338/2–5; 425/389, 26

(56) References Cited

U.S. PATENT DOCUMENTS

| | | | | |
|---|---|---|---|---|
| 4,463,336 A | * | 7/1984 | Black et al. | 338/4 |
| 4,684,339 A | * | 8/1987 | Bezama et al. | 425/389 |
| 5,318,652 A | * | 6/1994 | Horning et al. | 156/273.9 |
| 5,511,428 A | * | 4/1996 | Goldberg et al. | 73/77.7 |
| 5,557,972 A | * | 9/1996 | Jacobs et al. | 73/756 |
| 5,589,810 A | * | 12/1996 | Fung | 338/4 |
| 5,597,957 A | | 1/1997 | Schieferdecker et al. | |
| 5,706,565 A | * | 1/1998 | Sparks et al. | 29/25.42 |
| 6,127,765 A | * | 10/2000 | Fushinobu | 310/306 |
| 6,136,630 A | * | 10/2000 | Weigold et al. | 438/50 |
| 6,156,585 A | * | 12/2000 | Gogoi et al. | 438/48 |
| 6,343,514 B1 | * | 2/2002 | Smith | 73/719 |
| 6,465,271 B1 | * | 10/2002 | Ko et al. | 438/48 |
| 6,484,585 B1 | * | 11/2002 | Sittler et al. | 73/718 |
| 6,629,465 B1 | * | 10/2003 | Maluf et al. | 73/724 |

OTHER PUBLICATIONS

Reyntjen et al. *The Nano–Pirani—Presumably the World's Smallest Pressure Sensor*, The 11th International Conference on Solid State Sensors and Actuators, Nunich, Germany, Jun. 10–14, 2001.
Chou et al.; *Fabrication and Study of a Shallow–Gap Pirani Vacuum Sensor with a Linearly Measurable Atmospheric Pressure Range*, Sensors and Materials, vol. 11, No. 6 (1999) pp. 383–392.
Meijer et al.; *Thermal Sensors*, Sensors Based on Thermal Measurements, Institute of Physics Publishing Ltd. (1994) pp. 161–168.
Mahan, Bruce H.; *University Chemistry*, The Properties of Gases, second edition, Addison–Wesley Publishing Company, Inc. pp. 74–76.
Madou, Marc J.; *Fundamentals of Microfabrication*, (1997) pp. 234–236.

* cited by examiner

*Primary Examiner*—Andrew H Hirshfeld
*Assistant Examiner*—Marissa Ferguson
(74) *Attorney, Agent, or Firm*—Oyen Wiggs Green & Mutala

(57) ABSTRACT

A thermal pressure sensor monitors pressure by measuring effects caused by variations of thermal conductivity between a member and a substrate to which the member is adhered by stiction. The interface between the member and the substrate behaves as an extremely narrow gap. In a preferred embodiment the member is a bridge extending between a pair of cantilever arms. Two pressure sensors may be combined in a Wheatstone bridge configuration. A method for fabricating a pressure sensor according to the invention comprises forming a layer of oxide on a substrate, depositing a layer of material on the oxide layer, forming the member from the layer of material, removing the oxide layer and then bringing the member into contact with the substrate. The portion of the substrate under the member may be patterned with plateaus and valleys.

33 Claims, 7 Drawing Sheets

GAS PRESSURE SENSOR BASED ON SHORT-DISTANCE HEAT CONDUCTION AND METHOD FOR FABRICATING SAME

CROSS-REFERENCE TO RELATED APPLICATIONS

This application claims the benefit of the filing date of U.S. provisional patent application No. 60/183,811 filed on 22 Feb. 2000.

TECHNICAL FIELD

This invention relates to sensors for measuring the pressure of gases. The invention has particular application to barometers and other pressure sensors for measuring pressures having magnitudes on the order of a few atmospheres.

BACKGROUND

Most absolute pressure sensors have a pressure reference chamber which is sealed by a diaphragm. Applied pressure deflects the diaphragm in an amount which depends upon the applied pressure. The applied pressure can therefore be measured by monitoring the deflection of the diaphragm. Deflection of the diaphragm can be monitored, for example, by measuring the capacitance of an air gap between the diaphragm and a reference plate. As is known to those skilled in the art, the capacitance depends upon the separation between the diaphragm and the reference plate. In the alternative, the stress on the diaphragm can be measured by a strain gauge coupled to the diaphragm. Either method can produce an output signal which corresponds to an applied pressure.

Diaphragm-type pressure sensors suffer from a number of disadvantages. Fabricating a reference chamber sealed by a diaphragm is more expensive than would be ideal. Further, diaphragm-type pressure sensors sense a mechanical signal. This signal may be caused to vary by external forces or vibrations. Therefore, such sensors must be mounted in such a manner that they are not subjected to forces which could distort the diaphragm or otherwise distort the output signal. These challenges have so-far interfered with the availability of inexpensive diaphragm-type pressure sensors which are sensitive, and which provide good long-term stability (e.g. better than a few mmHg per year for barometric pressure measurements).

It is well known that the thermal conductivity of a low-density gas is proportional to pressure. This principle has been applied successfully in thermal vacuum sensors. Such sensors typically operate at pressures below 100 Pa (approximately 0.001 atmospheres). At this low pressure the mean free path between molecular collisions is large. Thus, gas molecules can transfer heat directly from the source to the destination without colliding with other gas molecules en route. However, pressure sensors based upon variations in thermal conduction have not been considered practical for use in measuring pressures exceeding about 0.001 atmospheres. At higher pressures gas molecules have a shorter mean free path. Thus a gas molecule is likely to collide with another gas molecule before it has had a chance to travel much farther than the mean free path. This decreases the effectiveness of heat transfer by the gas molecules. At about one atmosphere (100 kPa) the mean free path of gas molecules decreases to about 0.1 micron. The thermal conductivity of a gas across a gap wider than a few microns is essentially independent of pressure as measured by current thermal pressure sensors.

There have been some attempts to increase the range of thermal pressure sensors by reducing the gap between a membrane area and unheated adjacent surfaces. Pressure sensors with an air gap as small as 0.3 $\mu$m have been reported. An example of such a narrow-gap device is described in Chou, B. C. S., Chen, C. N., Shie, J. S., *Fabrication and Study of a Shallow-Gap Pirani Vacuum Sensor with a Linearly Measurable Atmospheric Pressure Range,* Sensors and Materials, vol. 11, No.6 (1999) pp. 383–392. While providing a narrow gap can extend the pressure measurement range to several bars it would be desirable to be able to extend the pressure measurement range to even higher pressures. It is difficult with current semiconductor fabrication techniques to fabricate devices having air gaps much smaller than about 0.3 $\mu$m.

Scieferdecker et al., U.S. Pat. No. 5,597,957 describes another narrow-gap thermal pressure sensor. This device has a membrane suspended by webs of membrane material between a pair of mirrored walls. The walls are spaced apart from the membrane by distances of less than 5 $\mu$m. The Scieferdecker et al. device is undesirably complicated to manufacture and does not operate at pressures as high as would be desirable.

Despite the availability of diaphragm-type pressure sensors and narrow-gap thermal pressure sensors there remains a need for low-cost, stable-baseline pressure sensors that may be used for measuring manifold pressures in engines, barometric pressures, tire pressures, pressures in industrial processes and for use in other applications where higher gas pressures must be measured.

SUMMARY OF THE INVENTION

This invention provides thermal pressure sensors which have a very small effective gap. Pressure sensors according to the invention have a member adhering to a substrate by stiction. Pressure can be measured by monitoring a parameter which varies with the pressure-dependent thermal conductivity of the interface between the member and the substrate. The parameter may be any one or more of a temperature of the member, a temperature of a region of the substrate adjacent the member, a heat input required to hold the member at a desired temperature or the like.

One aspect of the invention provides a pressure sensor comprising a member adherent by stiction to a surface of a substrate, means for heating the member and means for monitoring a temperature of the member. Illustrative embodiments of the present invention are described in the following detailed description.

Another aspect of the invention provides a method for fabricating a narrow-gap thermal pressure sensor, the method comprises providing a member adjacent a substrate surface; and, allowing the member to contact the surface and adhere to the surface by stiction.

Further features and advantages of the invention are described below.

BRIEF DESCRIPTION OF DRAWINGS

In figures which illustrate non-limiting embodiments of the invention.

DESCRIPTION

Figure 1:
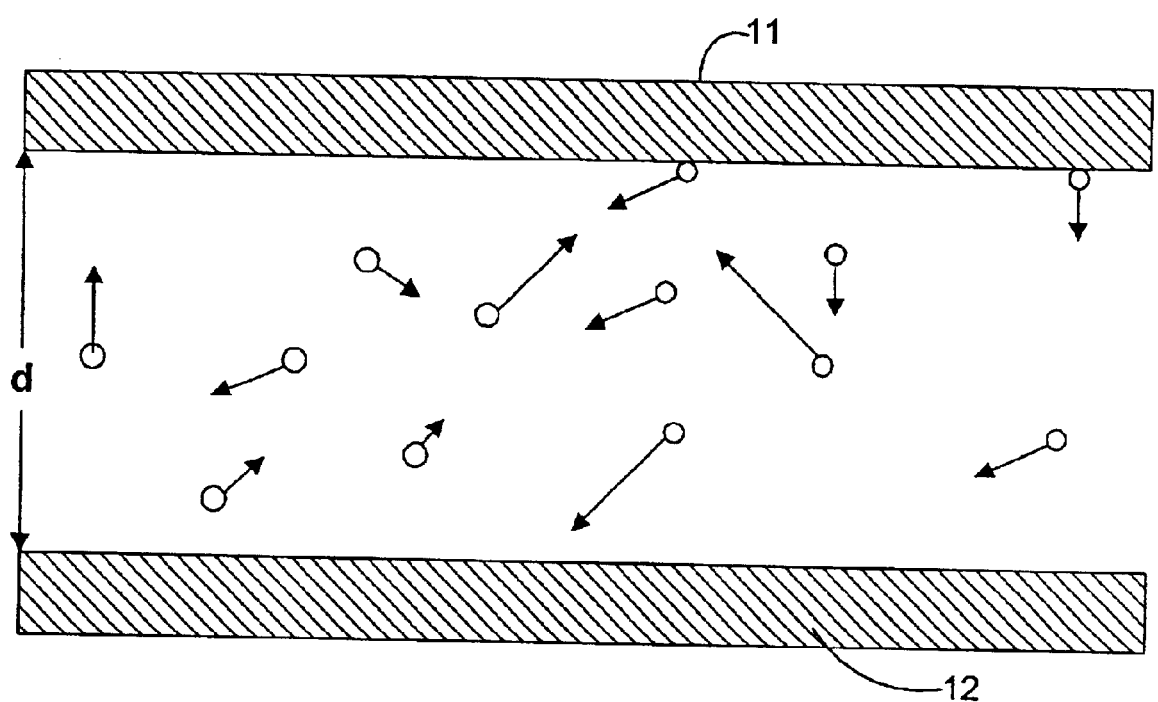
FIG. 1 is an illustration showing how heat is conducted between a pair of plates by gas molecules.

FIG. 1 illustrates the thermal conduction between two plates which occurs as a result of the presence of gas molecules in the space between the plates. Thermal vacuum pressure gauges, including the pressure gauge which is the subject of this invention, rely upon the fact that the thermal conductivity across the gap between the plates varies with gas pressure. A pair of plates 11 and 12 are separated by a distance d. Plate 11 is hotter than plate 12.

Distance d is typically greater than about 1 mm in thermal vacuum pressure gauges. In typical thermal pressure measurement devices distance d ranges from ½ μm to a few μm. Where gas pressure is low, distance d is smaller than the mean free path of molecules in the gas. Gas molecules can therefore generally transfer heat directly from hot plate 11 to cold plate 12 without colliding with other gas molecules en route. Since the number of molecules available to conduct heat in this manner in a given volume is proportional to pressure, the rate at which heat is transferred from plate 11 to plate 12 is a nearly linear function of pressure.

Figure 2:
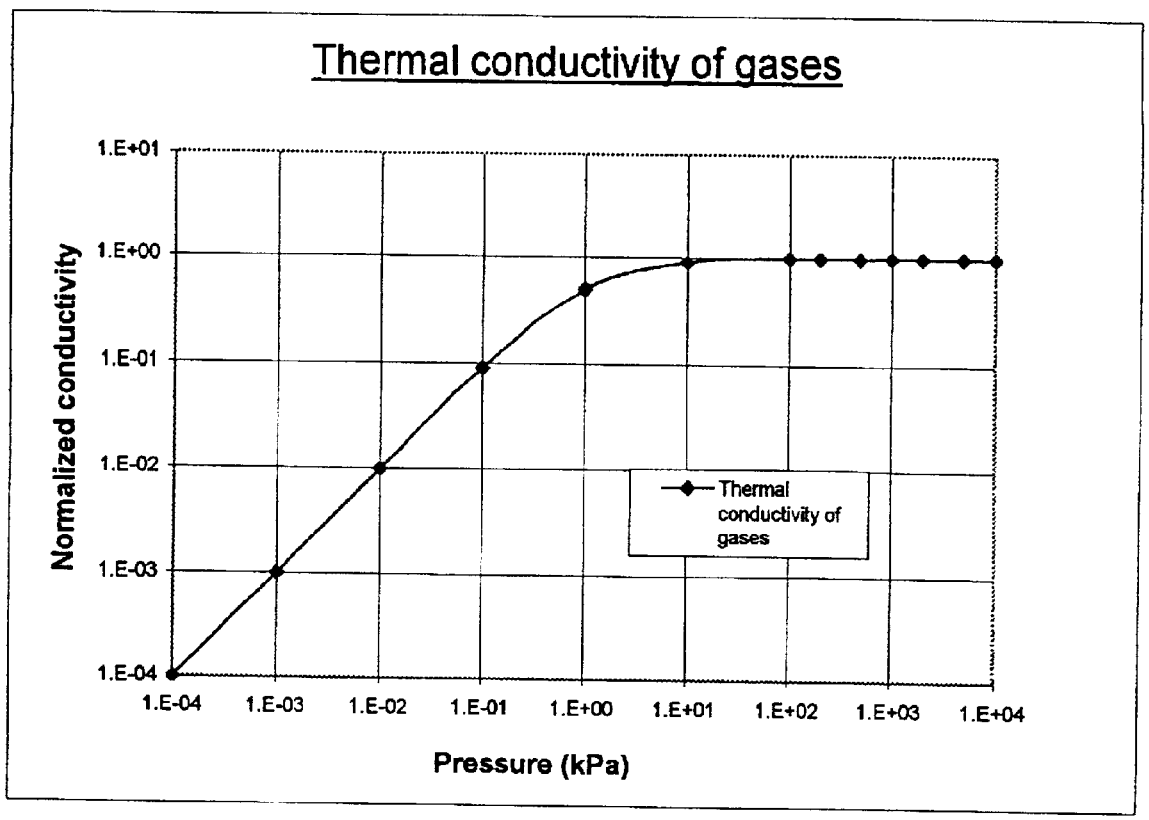
FIG. 2 is a graph illustrating the relationship between pressure and thermal conductivity across a gap between a pair of parallel plates.

FIG. 2 is a graph which demonstrates the relationship between pressure and thermal conductivity in a pressure sensor having a gap distance such that this holds true for gas pressures of less than about 100 Pa. The thermal conductivity of the gas in the gap between plates 11 and 12 can be determined by heating one of the plates at a known rate and monitoring its temperature.

At higher pressures, the mean free path of gas molecules is reduced. For example, at 100 kPa (about 1 atmosphere), the mean free path of nitrogen molecules is approximately 0.1 μm. If the pressure is increased enough, the mean free path of gas molecules between the plates will become much smaller than the separation between the plates. Under this condition molecular collisions greatly decrease the efficiency with which molecules transfer heat between plates 11 and 12. Consequently, in this high pressure regime, heat conduction is dominated by diffusion, and is independent of pressure. The high pressure regime can be seen in FIG. 2 at pressures exceeding about 100 kPa.

This invention provides a pressure sensor whose operation is based on variations in the thermal conductivity of a gas over extremely short distances. When pressure increases, more molecules are available for heat conduction. This results in a higher thermal conductivity.

Figure 3:
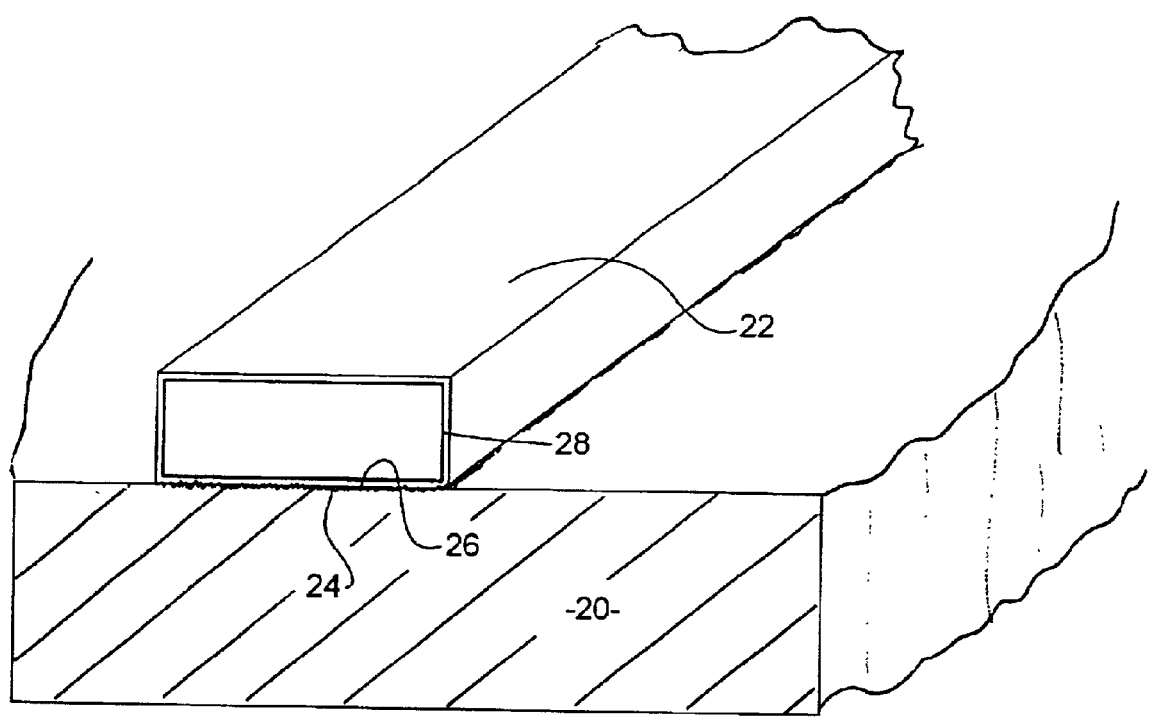
FIG. 3 is a partially schematic diagram illustrating a pressure sensor according to this invention.

As shown in FIG. 3, a pressure sensor according to this invention is fabricated on a suitable substrate 20, such as a semiconductor wafer. The pressure sensor includes a member 22 which is located adjacent the surface of substrate 20. Preferably member 22 is attached to substrate 20 and is formed by a micromachining process. An example of a process for forming a pressure sensor according to a preferred embodiment of the invention is described below. Member 22 has a lower surface 24 which lies against an upper surface 26 of substrate 20. In the preferred embodiment of the invention, member 22 is held permanently to surface 26 by stiction, which is the tendency of two very clean surfaces to stick together. Wafer bonding is an example of the application of stiction forces to hold materials together.

The microscopic roughness of surfaces 24 and 26 prevents member 22 from fitting perfectly against substrate 20. Preferably surfaces 24 and 26 have surface roughness in the range of nanometers to tens of nanometers. The surface roughness of the two surfaces causes there to be small spaces between the surfaces. If member 22 is made from deposited polysilicon and substrate 20 is a single crystal silicon wafer then the underside of member 22 will typically be considerably rougher than the upper surface of substrate 20. The small spaces between member 22 and substrate 20 cause the interface between member 22 and substrate 20 to exhibit a pressure-dependent variation in thermal conductivity which behaves in the manner of an air gap having an effective gap width on the order of nanometers. This gap is used in this invention for making short-distance heat conduction measurements for the determination of air pressure.

Surfaces 24 and/or 26 may be patterned to provide a desired degree of relief between plateaus and valleys in the surfaces. For example, surface 26 may be patterned with alternating plateaus and valleys. The tops of the plateaus are elevated from the bottoms of the valleys by a very small distance, for example, a few nanometers. The difference in elevation between the tops of the plateaus and the bottoms of the valleys is preferably in the range of 3 to 20 nanometers.

Such plateaus and valleys may be created, for example, by a method which includes growing a first layer of oxide on surface 26, removing substantially all of the first layer of oxide in portions of the first layer of oxide corresponding to the valleys, growing more oxide on surface 26 until a thin layer of oxide has formed in the removed portions of the first layer (and the layer of oxide has grown thicker in other portions of the first layer)and then removing the oxide from surface 26 to leave an exposed surface with a pattern of plateaus and valleys. This process utilizes the facts that oxidation consumes the material of substrate 20 and oxidation proceeds more slowly through an existing oxide layer than it does on an exposed surface of substrate 20. The plateaus may be in the form of ridges or may comprise spots which act as pillars to support member 22. The plateaus should be close enough together that member 22 cannot collapse to contact portions of surface 26 which lie in the valleys. The plateaus may be separated, for example, by a distance of a few μm or less. Preferably the plateaus are separated from each other by distances of about 10 μm or less. The required separation between the plateaus will depend in part upon the rigidity of member 22.

Figure 8:
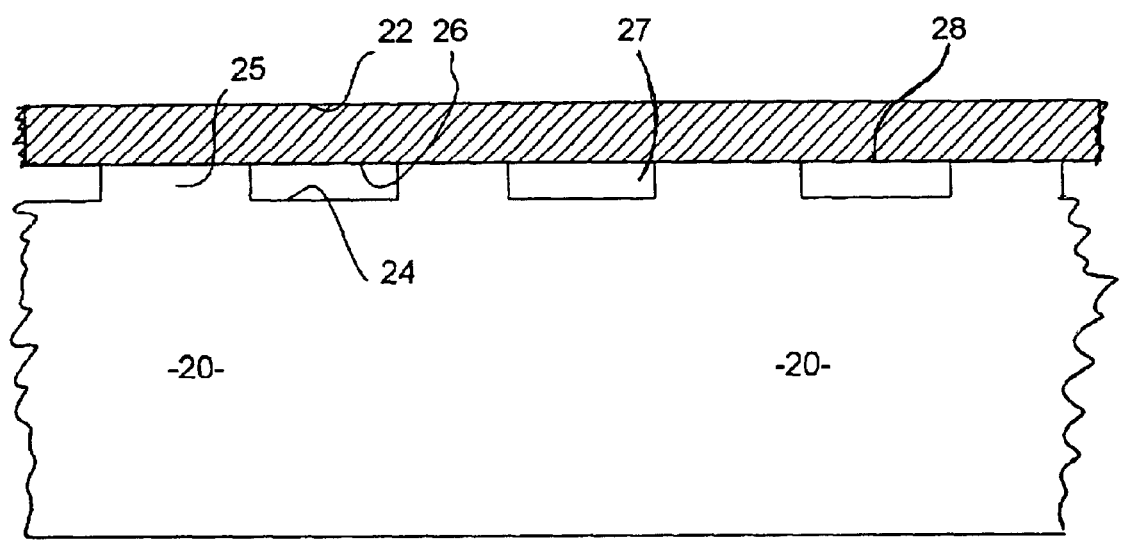

FIG. 8 is a magnified cross section through the active part of a pressure sensor. Surface 26 of wafer 20 has been patterned to provide a number of square-topped plateaus 25 separated by shallow valleys. A member 22 adheres by stiction to tops of plateaus 25. Gaps 27 are defined between surface 24 of member 22 and the portions of surface 26 in the valleys between plateaus 25.

Preferably there is no electrical continuity from member 22 into wafer 20 across surfaces 24 and 26. An electrically insulating barrier 28 is preferably provided on at least one of surfaces 24 and 26. Such a barrier may be provided, for example, by a thin layer of an electrically insulating oxide on surfaces 24 and/or 26. Typically it is convenient to form the insulating oxide layer on both surfaces 24 and 26. Where the substrate is silicon and the bridge is silicon or polysilicon each of surfaces 24 and 26 are preferably coated with a thin insulating layer of silicon dioxide.

Member 22 can be heated. In the preferred embodiment, member 22 is heated by passing an electrical current through the material of member 22. The heat deposited in member 22 is carried away from member 22, at least in part, by thermal conduction between member 22 and wafer 20 across the air gaps between surfaces 24 and 26. While there will be some direct conduction of heat between member 22 and wafer 20 at the locations where surfaces 24 and 26 are in physical contact with one another, this component of the thermal conduction will not vary significantly with pressure (i.e. it will remain substantially constant).

The thermal conduction between member 22 and wafer 20 can be measured by monitoring the temperature of member 22. Since the electrical resistively of most materials is a function of temperature it is convenient to use the electrical resistance of member 22 as a measure of the thermal conduction between member 22 and wafer 20. If this is done then a separate temperature sensor is not required. The temperature of member 22 could be sensed in an alternative manner without departing from the invention. For example, a separate temperature sensor could be fabricated on member 22.

Pressure sensors according to the invention can be made to operate in various modes of operation. In one mode of operation the amount of heat deposited in member 22 is adjusted to control the temperature. In another mode of operation the amount of heat deposited in member 22 is kept fixed and the temperature of member 22 is monitored. Those skilled in the art will understand that either of these modes of operation, as well as any other mode of operation which generates a signal which varies with the thermal conductivity between member 22 and wafer 20 can be used in a pressure sensor according to the invention.

Figure 4:
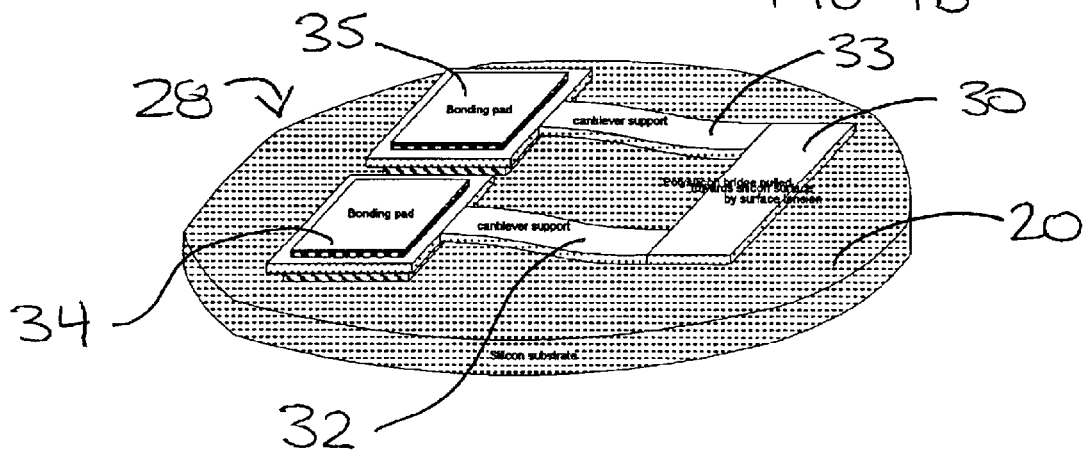
FIG. 4 illustrates a pressure sensor according to an embodiment of the invention having a bridge supported at the ends of cantilever arms.

FIG. 4 shows a pressure sensor 28 according to a preferred embodiment of the invention wherein member 22 comprises a bridge 30 supported at the ends of cantilever arms 32 and 33. Bridge 30 and cantilever arms 32 and 33 are preferably fabricated on wafer 20 by micromachining, for example, according to the process described below. Preferably, bridge 30 is quite small. For example, bridge 30 may have a length on the order of 100 $\mu$m, a width on the order of 5 $\mu$m and a thickness on the order of ½ $\mu$m. Preferably bridge 30 has a length in the range of 50 $\mu$m to 250 $\mu$m and a width in the range of 1 $\mu$m to 10 $\mu$m. The width is most preferably in the range of about 2 $\mu$m to about 5 $\mu$m.

In the preferred embodiment of the invention, wafer 20 is a silicon wafer and bridge 30 and cantilever arms 32 and 33 are made of heavily doped polysilicon. Cantilever arms 32 and 33 extend from pads 34 and 35 respectively. Pads 34 and 35 are attached to the surface of wafer 20. Cantilever arms 32 and 33 are sufficiently flexible to permit bridge 30 to sit against the upper surface of wafer 20. Cantilever arms 32 and 33 and bridge 30 are electrically insulated by a thin layer of native silicon oxide on their surfaces.

An electrical current can be passed through bridge 30 by applying a potential difference between pads 34 and 35. Electrical power dissipated in bridge 30 by the passage of this electrical current heats bridge 30. The electrical resistance of bridge 30 can be determined by measuring the electrical current through bridge 30 and the potential difference across bridge 30 and applying Ohm's law.

Figure 5:
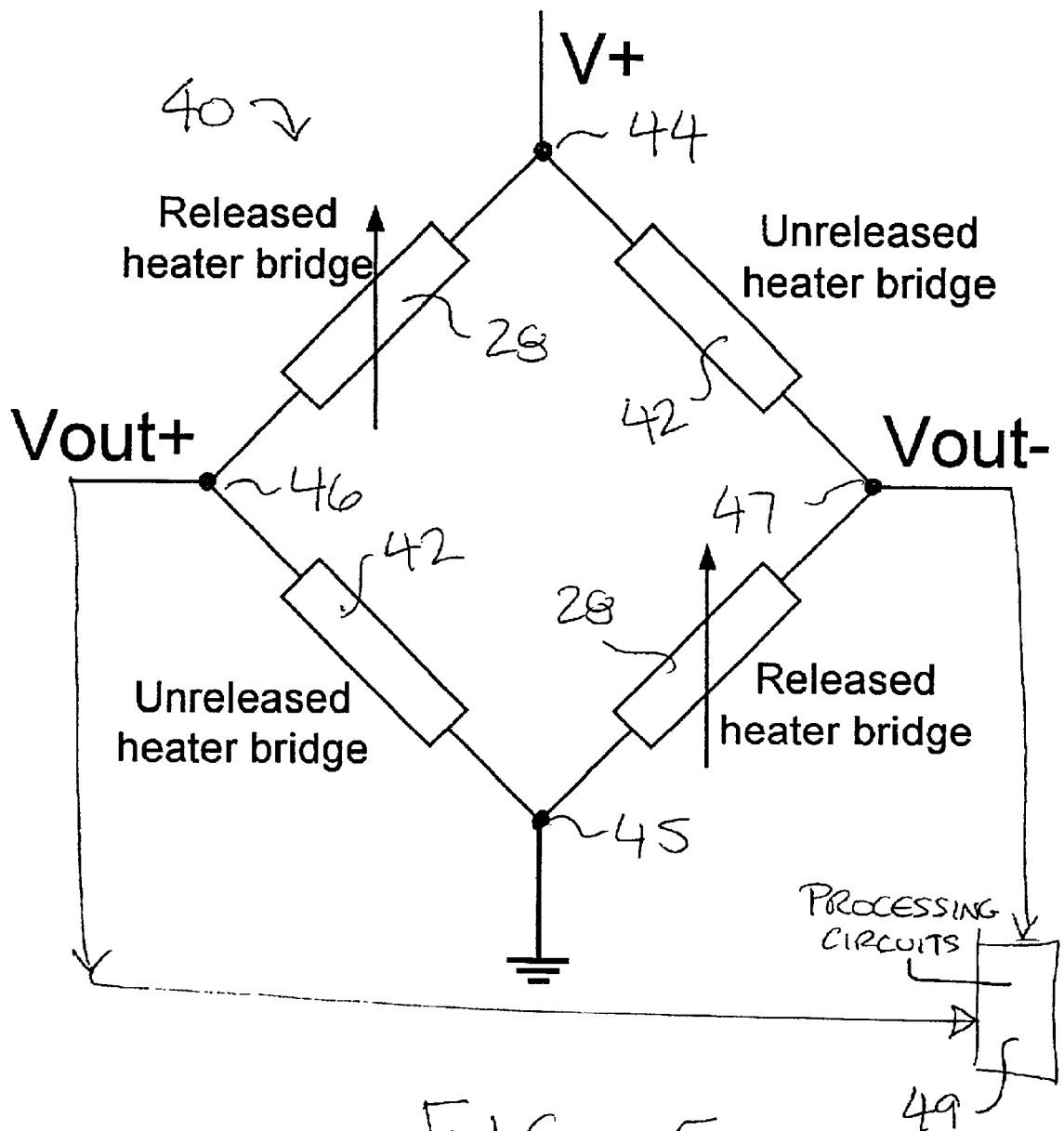
FIG. 5 is a diagram illustrating a pair of pressure sensors according to the invention connected in a Wheatstone bridge configuration.

As shown in FIG. 5, it is convenient to provide a composite sensor 40 which includes two substantially identical pressure sensors 28 connected in a Wheatstone bridge configuration together with two substantially identical resistors 42. This configuration is insensitive to changes in ambient temperature as changes in the ambient temperature will have the same effect on each of pressure sensors 28 and on each of resistors 42. Resistors 42 may each comprise a cantilever structure comprising a bridge 30 and cantilever arms 32 and 33 which is substantially the same as the structure of one of pressure sensors 28 except that cantilever arms 32 and 33 and bridge 30 are supported above the surface of wafer 20, for example by a layer of silicon dioxide which prevents air from entering the space under the cantilever arms and bridge.

An input voltage, for example in the range of 1 to 3 volts, is applied between terminals 44 and 45 of sensor 40. A resulting electrical current passes through bridges 30 of pressure sensors 28. Power dissipated in bridges 30 generates heat and raises the temperatures of bridges 30. The native oxide layers on bridges 30 prevents the electrical current from being shunted by wafer 20. An output voltage is measured across contacts 46 and 47 of composite sensor 40.

The voltage-to-current ratio provides a measure of the electrical resistance of bridge 30, and thus the temperature of bridge 30. When pressure changes, the coefficient of thermal conduction at the thin air gaps underlying bridges 30 in pressure sensors 28 changes. This results in a change in bridge temperature, and bridge electrical resistance. Since the voltage dropped across resistors 42 is not pressure dependent, the change in thermal conductivity at pressure sensors 28 causes an electrical output related to the air pressure to be provided at contacts 46 and 47.

Circuitry 49 for processing the output signal at contacts 46 and 47 may optionally be formed in wafer 20 by any suitable semiconductor fabrication process. For example, wafer 20 may contain integrated circuitry for conditioning the output signal, linearizing the output from composite pressure sensor 28, amplifying the output signal, or the like. Such circuitry could also be provided separately from wafer 20.

Figure 6:
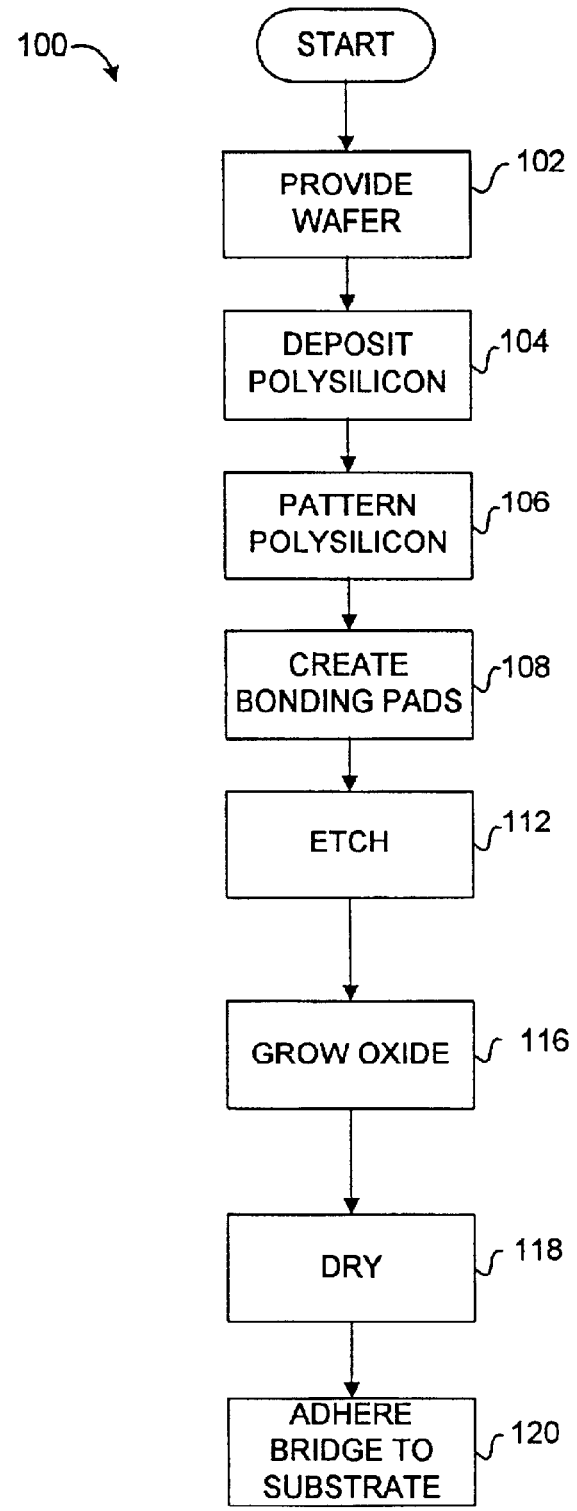
FIG. 6 is a flow chart illustrating steps in a method for fabricating a pressure sensor according to the invention.

A device according to the preferred embodiment of this invention may be fabricated using well understood and mature techniques which are common in the manufacture integrated circuits. Similar techniques are used in the field of surface micromachining. For example, a method 100 for fabricating a pressure sensor according to the invention is shown in FIG. 6. Method 100 begins with by providing a silicon wafer having a generally planar surface bearing a thin layer of oxide (102). The oxide layer is preferably not more than about 0.5 $\mu$m thick.

Figure 7A:
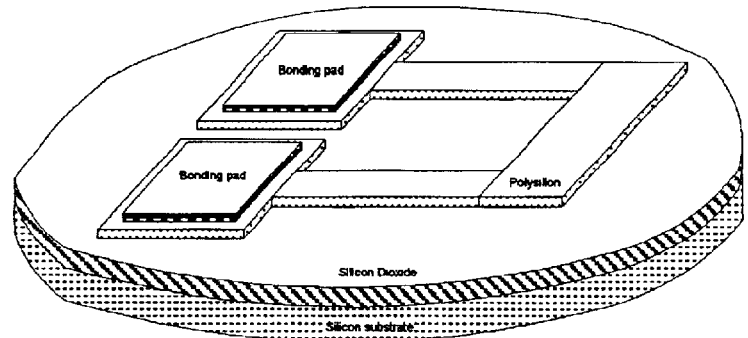
FIGS. 7A and 7B are diagrams illustrating the pressure sensor of FIG. 4 in intermediate stages of manufacture; and, FIG. 8 is a greatly magnified and not to scale sectional view through a pressure sensor according to one embodiment of the invention wherein a surface of a substrate is patterned with a pattern of peaks and valleys.

On the oxide layer a 0.5-micron thin-film polysilicon is deposited (104). The polysilicon layer is patterned (106) to yield a compound structure which has a polysilicon heater bridge supported between two cantilever support arms. Typical widths of the support arms and heater bridge are 10 $\mu$m or less. The compound cantilever is attached to two larger area polysilicon pads. A thin layer of aluminum, or other electrically conductive material, is deposited on the pads and patterned to provide bonding pads for establishing electrical connections to the pads (108). The device structure at the completion of these processing steps is illustrated in FIG. 7A.

Figure 7B:
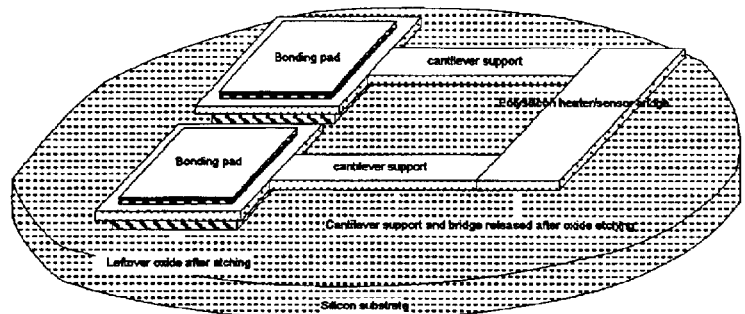

The structure is then etched (112) in an etchant, which removes oxide readily but does not attack polysilicon or aluminum significantly. The etching is preferably performed by a wet etching process. An extended oxide etch undercuts and removes the sacrificial oxide layer underneath the compound cantilever and releases it from the silicon substrate. This etch, however, is terminated before it removes all of the oxide from underneath the larger polysilicon bonding pads, leaving them anchored to the silicon substrate to support the compound cantilever. FIG. 7B shows the device structure at the completion of etching step 112.

After etching step 112, a thin oxide layer is grown on the polysilicon cantilever arms and bridge (116). This may be done by rinsing the device in deionized water for sufficient time to provide a thin layer of native oxide on the polysilicon surface. A thin native layer of silicon dioxide will also be formed on the surface of wafer 20. This step may be performed at room temperature. Optionally hydrogen peroxide or another oxidizing material may be used in place of, or in addition to, deionized water to promote the effective growth of a thin oxide layer on the polysilicon. The heater bridge is then adhered to the silicon substrate by stiction (120). This may be done by simply drying the device (118).

The drying causes the released heater bridges 30 to be drawn towards the surface of wafer 20 by surface tension of the drying water film. When a heater bridge contacts the surface of silicon wafer 20 it tends to stick there. This is the "stiction" phenomenon many researchers experience and try to avoid when releasing micromachined structures. Once a small structure is collapsed onto the silicon substrate and held by stiction, the mechanical forces required to dislodge the structure are typically large enough to damage the micromechanical structure. This invention uses stiction to advantage as a convenient and cost-effective means of attaching the heater bridge 30 to the substrate. A finished pressure sensor 28 is shown in FIG. 4.

Resistors 42 may be formed by fabricating unreleased heater bridges. This may be done by performing steps 102 through 108 for resistors 42 but leaving a layer of material (for example an aluminum line) of appropriate width on top of the cantilevers and bridge which are destined for use as a resistor 42. The aluminum lines are used as an etch mask to prevent the removal of oxide underneath the heater bridges of resistors 42 in step 112.

In the above description the cantilever support arms facilitate the collapse of the heater bridge onto the substrate under the forces exerted by surface tension during the drying process.

Pressure sensors according to the invention may also be fabricated by performing etching step 112 using a dry etching process and subsequently bringing bridge 30 into contact with the surface of substrate 20 with sufficient force that bridge 30 becomes held to substrate 20 by stiction forces.

A further possible method of fabricating a pressure sensor according to the invention comprises creating an oxide layer on the surface of a silicon wafer, bonding a second layer of silicon onto the oxide layer, selectively etching the second layer of silicon to form a bridge 30 and etching away the oxide layer under the bridge as described above. The selective etching of the second layer of silicon may comprise doping portions of the layer which will form the bridge and then using an etchant which etches undoped or lightly doped silicon much more rapidly than more heavily doped silicon. Such etchants are well known to those skilled in the art of fabricating structures in silicon.

As will be apparent to those skilled in the art in the light of the foregoing disclosure, many alterations and modifications are possible in the practice of this invention without departing from the spirit or scope thereof. For example:

While, in the preferred embodiment of the invention, member 22 is heated by passing an electrical current through the material of member 22, member 22 could be heated in an alternative manner. For example, a pressure sensor according to the invention could have a separate electrically conducting trace on member 22 for heating member 22;

While, in the currently preferred embodiment of the invention, the heater and temperature sensor are combined, as noted above, the heater and temperature sensor could comprise separate elements which are electrically isolated from one another. In this case, the temperature sensor could comprise, for example: a separate resistor having a resistance which varies with temperature; a thermocouple having a junction on the bridge and a reference junction remote from the bridge; a p-n junction, or the like.

Instead of placing the temperature sensor on the bridge, a temperature sensor could be provided on the wafer under the bridge. The temperature at such a temperature sensor would vary with the thermal conductivity between the bridge and the wafer. The local temperature of the portion of the wafer adjacent the bridge will vary with the rate at which heat flows from the bridge into the wafer, which acts as a heat sink.

Instead of a bridge supported by cantilever arms, member 22 may comprise a long bridge having an aspect ratio such that the bridge length is much larger than its thickness. The long bridge may be generally linear. If the bridge is long and thin enough then its central portion can collapse onto the surface of wafer 20 where it can be held by stiction.

The material of the cantilevers and bridge need not necessarily be polysilicon. Other materials, or suitable combinations of materials could be used for the cantilevers and bridge in the alternative. Materials such as aluminum, copper or tungsten could be used to make the cantilevers and bridge in a pressure sensor according to the invention.

Accordingly, the scope of the invention is to be construed in accordance with the substance defined by the following claims.

What is claimed is:

1. A pressure sensor comprising:
a substrate;
a member having a portion adherent by stiction to a surface of the substrate,
means for heating the portion of the member; and
means for monitoring a temperature of the portion of the member, the means for monitoring a temperature of the portion of the member controlling an output signal to indicate a pressure of a gas to which the pressure sensor is exposed.

2. The pressure sensor of claim 1 wherein at least one of:
a surface of the portion of the member in contact with the substrate; and,
the surface of the substrate in contact with the portion of the member;
has a surface roughness in the range of nanometers to tens of nanometers.

3. The pressure sensor of claim 1 wherein the means for heating the portion of the member comprises an electrically conductive pathway passing through the member and a source of electrical current connected to pass electrical current along the conductive pathway.

4. The pressure sensor of claim 3 wherein the electrically conductive pathway has a temperature-dependent electrical resistance and the means for monitoring a temperature of the portion of the member comprises the electrically conductive pathway.

5. The pressure sensor of claim 3 comprising an electrically insulating layer on a surface of the member.

6. The pressure sensor of claim 5 wherein the member comprises polysilicon and the electrically insulating layer comprises a layer of silicon dioxide.

7. The pressure sensor of claim 6 comprising an electrically insulating layer on the surface of the substrate.

8. The pressure sensor of claim 1 wherein the member comprises a bridge extending between a pair of cantilever members, each of the cantilever members having one end attached to the substrate and another end connected to the bridge.

9. The pressure sensor of claim 8 wherein the cantilever members are attached to the substrate by a pad and an oxide layer between the pad and the substrate.

10. The pressure sensor of claim 1 wherein the member has a length in the range of 50 $\mu$m to 250 $\mu$m and a width in the range of 1 $\mu$m to 10 $\mu$m.

11. A pressure sensor comprising:
a substrate;
a member adherent by stiction to a surface of the substrate,
means for heating the member; and
means for monitoring a temperature of the member, the means for monitoring a temperature of the member controlling an output signal to indicate a pressure of a gas to which the pressure sensor is exposed;
wherein the member comprises a generally linear elongated bridge supported above the substrate at either end, the bridge having a central portion collapsed onto and adhering by stiction to the surface of the substrate.

12. The pressure sensor of claim 1 wherein the substrate comprises silicon and the member comprises polysilicon.

13. The pressure sensor of claim 1 wherein the member comprises a material selected from the group consisting of silicon, polysilicon, copper, aluminum and tungsten.

14. The pressure sensor of claim 1 wherein the surface of the substrate is patterned with a pattern of plateaus and valleys in its portion under the member, the member is adherent by stiction to the plateaus, and the member is not in contact with the valleys.

15. The pressure sensor of claim 14 wherein the plateaus and valleys differ in elevation by a distance in the range of 3 nanometers to 20 nanometers.

16. The pressure sensor of claim 1 wherein the means for monitoring a temperature of the portion of the member comprises a temperature sensor in the substrate and under the member.

17. The pressure sensor of claim 16 wherein the temperature sensor comprises a p-n junction.

18. The pressure sensor of claim 1 wherein the member comprises a generally linear elongated bridge supported above the substrate at either end, and the portion of the member comprises a central portion of the bridge collapsed onto and adhering by stiction to the surface of the substrate.

19. A composite pressure sensor comprising first and second pressure sensors the first and second pressure sensors each comprising:
a substrate;
a member adherent by stiction to a surface of the substrate,
means for heating the member; and
means for monitoring a temperature of the member, the means for monitoring a temperature of the member controlling an output signal to indicate a pressure of a gas to which the pressure sensor is exposed;
the pressure sensors arranged with first and second resistors in a Wheatstone bridge configuration having first and second output points and first and second input points, the means for monitoring a temperature of the member of the first pressur sensor connected between the first input point and the first output point, the means for monitoring a temperature of the member of the second pressure sensor connected between the second input point and the second output point, the first resistor connected between the first input point and the second output and the second resistor connected between the second input point and the first output point.

20. The composite pressure sensor of claim 19 wherein the first and second resistors comprise members substantially the same as the members of the first and second pressure sensors but which are sealed to the surface of the substrate by an oxide layer.

21. The composite pressure sensor of claim 20 comprising a metallic masking layer covering the members of the first and second resistors.

22. A pressure sensor comprising a substrate, a member having a portion adherent by stiction to a surface of the substrate, a heater located to heat the portion of the member and a temperature sensor located to generate a signal responsive to a temperature of the portion of the member, the signal indicative of a pressure of a gas to which the pressure sensor is exposed.

23. The pressure sensor of claim 22 wherein at least one of a surface of the portion of the member in contact with the substrate and a surface of the substrate in contact with the portion of the member has a surface roughness in the range of nanometers to tens of nanometers.

24. The pressure sensor of claim 22 wherein the heater comprises an electrically conductive pathway passing through the member and a source of electrical current connected to pass electrical currant along the electrically conductive pathway.

25. The pressure sensor of claim 22 wherein the member comprises a bridge extending between a pair of cantilever members, each of the cantilever members having one end attached to the substrate and another end connected to the bridge.

26. The pressure sensor of claim 22 wherein the member has a length in the range of 50 $\mu$m to 250 $\mu$m and a width in the range of 1 $\mu$m to 10 $\mu$m.

27. The pressure sensor of claim 22 wherein the substrate comprises silicon and the member comprises polysilicon.

28. The pressure sensor of claim 22 wherein the member comprises a material selected from the group consisting of silicon, polysilicon, copper, aluminum and tungsten.

29. The pressure sensor of claim 22 wherein the surface of the substrate is patterned with a pattern of plateaus and valleys in its portion under the portion of the member, the portion of the member is adherent by stiction to the plateaus, and the member is not in contact with the valleys.

30. The pressure sensor of claim 22 wherein the temperature sensor is located in the substrate under the member.

31. The pressure a sensor of claim 22 wherein the member comprises generally linear elongated bridge supported above the substrate at either end and the portion of the member comprises a central portion of the bridge collapsed onto and adhering by stiction to the surface of the substrate.

32. A pressure sensor comprising a substrate, a member adherent by stiction to a surface of the substrate, a heater located to heat the member and a temperature sensor located to generate a signal responsive to a temperature of the member, the signal indicative of a pressure of a gas to which the pressure sensor is exposed wherein the member comprises a generally linear elongated bridge supported above the substrate at either end, the bridge having a central portion collapsed onto and adhering by stiction to a surface of the substrate.

33. A composite pressure sensor comprising first and second pressure sensors arranged with first and second resistors in a Wheatstone bridge configuration having first and second output points and first and second input points, each of the pressure sensors comprising a substrate, a member adherent by stiction to a surface of the substrate, a heater located to heat the member and a temperature sensor located to generate a signal responsive to a temperature of the member the signal indicative of a pressure of a gas to which the pressure sensor is exposed the temperature sensor of the first pressure sensor connected between the first input point and the first output point, the temperature sensor of the second pressure sensor connected between the second input point and the second output point, the first resistor connected between the first input point and the second output point and the second resistor connected between the second input point and the first output point.

* * * * *